(12) United States Patent
Swanberg et al.

(10) Patent No.: US 6,895,508 B1
(45) Date of Patent: May 17, 2005

(54) STACK MEMORY PROTECTION

(75) Inventors: Randal Craig Swanberg, Round Rock, TX (US); Michael Stephen Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 09/657,121

(22) Filed: Sep. 7, 2000

(51) Int. Cl.[7] .............................................. G06F 12/14
(52) U.S. Cl. ....................... 713/200; 711/152; 711/163; 711/170
(58) Field of Search ..................... 713/200; 711/152, 711/170, 163

(56) References Cited

U.S. PATENT DOCUMENTS

| | | | | |
|---|---|---|---|---|
| 4,701,846 A | * | 10/1987 | Ikeda et al. | 711/163 |
| 5,408,650 A | * | 4/1995 | Arsenault | 717/124 |
| 5,513,337 A | * | 4/1996 | Gillespie et al. | 711/152 |
| 5,596,739 A | * | 1/1997 | Kane et al. | 711/152 |
| 5,657,475 A | * | 8/1997 | Gillespie et al. | 711/163 |
| 5,684,948 A | * | 11/1997 | Johnson et al. | 713/200 |
| 5,835,958 A | * | 11/1998 | Long et al. | 711/170 |
| 5,920,690 A | * | 7/1999 | Moyer et al. | 713/200 |
| 6,170,059 B1 | * | 1/2001 | Pruett et al. | 713/200 |
| 6,175,916 B1 | * | 1/2001 | Ginsberg et al. | 712/228 |
| 6,609,247 B1 | * | 8/2003 | Dua et al. | 717/128 |

* cited by examiner

Primary Examiner—Emmanuel L. Moise
Assistant Examiner—Pramila Parthasarathy
(74) Attorney, Agent, or Firm—Richard E. Frankeny; Winstead Sechrest & Minick P.C.; Diana L. Roberts-Gerhardt

(57) ABSTRACT

A method and system for memory page protection wherein new stack memory load/store instructions are defined for memory management. A corresponding operating system and compiler utilize these new stack memory load/store instructions. Whenever it is desired to have a block of memory used as a stack memory, the stack memory load/store instructions are used. A stack memory attribute is stored in a page table associated with the block of memory. Memory blocks having a stack memory attribute may be read and written into using only stack memory load/store instructions. If a normal load/store is attempted to a memory block having a stack memory attribute a error condition is indicated. Likewise a stack memory load/store to a block of memory not have a stack memory attribute will cause a error condition. Stack memory load/stores meant for one type of stack memory (e.g., program stack attribute) will also cause a fault if the stack load/store is attempted to another type of stack memory (e.g., processor stack). Stack memory (processor stacks), transparent to a programmer writing code for a processor employing stack memory attributes, would have a processor stack attributes assigned by the processor or CPU. Using this method and system, stack memory may be assigned anywhere in memory without creating wasted protected pages or having data corrupted by stack memory overruns or under runs. The operating system no longer needs to allocate specific space in memory as stack memory and likewise does not have to estimate how much memory will be needed for program stacks and processor stacks (e.g.IA64 register stacks).

28 Claims, 5 Drawing Sheets

STACK MEMORY PROTECTION

TECHNICAL FIELD

The present invention relates in general to managing stacks within a computer system, in particular managing memory used for program stacks and processor stacks.

BACKGROUND INFORMATION

Computer systems use stacks which may be registers or memory blocks where data is stored and retrieved in a particular fashion (e.g., last in first out or first in first out). The operating system (OS) within the computer system may manage numerous stacks, interrupt stacks, kernel stacks, thread stacks, user stacks, etc. Some stacks in a computer system are fixed in hardware (e.g., fixed register stacks) and others are merely memory allocations (stack memory) wherein a block of memory is defined as a stack whose size and the location may be variable. A fixed register stack is easier to manage since the size is known and simple techniques of adding and subtracting entries from a counter give an indication of the availability of locations within the register stack for storing data. When a stack may be variable in size and location then, it may prove difficult to manage the stack memory along with other necessary memory allocation management without wasting (by blocking access) memory space.

Some computer architectures (e.g., Intel IA64) have begun to use multiple variable stacks per execution context compounding the problem of managing the variable stacks within the other memory management requirements. Within stack memory (memory designated by the operating system only for stack use) there have traditionally been two types of stacks, a "program stack" and a "processor stack" (e.g., an IA64 register stack). The program stack is the "traditional" run-time stack where the program saves/restores hardware register data. The processor stack is a new additional run-time stack required by some computer architectures (e.g., IA64) so the processor can save/restore hardware register data, however these stacks may be transparent to a compiler or a programmer. The operating system (OS) maintains tables of available memory for the processor to use as a processor stack. The main difference between the program stack and the processor stack is that the program stack is used by the compiler for procedural local data and the processor stack is used by the processor for stacked register data (essentially making the registers a cache of recently used, current context registers) and may be transparent to a programmer (e.g., in IA64).

One of the classic issues in managing stack memory is how to protect against a stack over run or under run. Traditionally, protection against an over run or an under run has been solved by allocating "red zones" or protected pages in memory. These protected pages were set up to cause a fault when an over run or under run occurs. The problem (which may be compounded with multiple variable stacks per execution context) in some computer architectures (e.g., IA64) is that pages are wasted in the requirement to set up the "red zones" or protected pages for every stack in the system. Also of concern is the fact that "red zones" do not always work, for example, a stack pointer may be decremented an amount greater than a "page size" and effectively skip over the protected page or "red zone". Likewise, the future use of multiple variable stacks per execution context (e.g., IA64) may create stacks that are potentially transparent to the compiler or programmer. Of particular concern are operations within these variable program stacks where information is corrupted without a corresponding error condition being signaled so that error correction techniques would enable recovery.

There is therefore a need for a system and method for managing stack memory that prevents stack corruption without there being appropriate recovery in place.

SUMMARY OF THE INVENTION

A new form of memory protection classification is implemented specific for "stack memory". This memory protection classification is implemented in a central processor (CPU) which is supported by a compiler and an operating system. The CPU, in creating the protection classification, generates a page table entry attribute wherein each page of a stack is mapped with the page table entry attribute. Compilers supporting the page table entry attribute would generate specific forms of load/store instructions when saving or restoring to/from program stacks. These new "stack" memory load/store instruction forms would result in the memory references requiring "stack memory protection" to succeed (assures that the stack memory load or store is executable) or a fault is raised. For all stack uses where stacks may be transparent to the compiler or the programmer, the references are generated internally by the CPU such that stack memory attributes are set for the processor stack. The stack memory protection results in both errant normal loads and stores to stack memory and errant stack memory loads and stores to non-stack memory causing faults. Multiple stack memory attributes are generated which differentiate memory into three dynamic regions. Assigning stack memory with a program stack attribute or a processor stack attribute leaves all remaining memory not so designated free for normal loads and stores. Flagging of error conditions if load/stores are attempted into unauthorized regions enables stack memory protection without wasting valuable memory space with variable protected pages where error detection may be unreliable. Protected pages that have to be speculatively set-up and managed by the operating system are no longer required.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
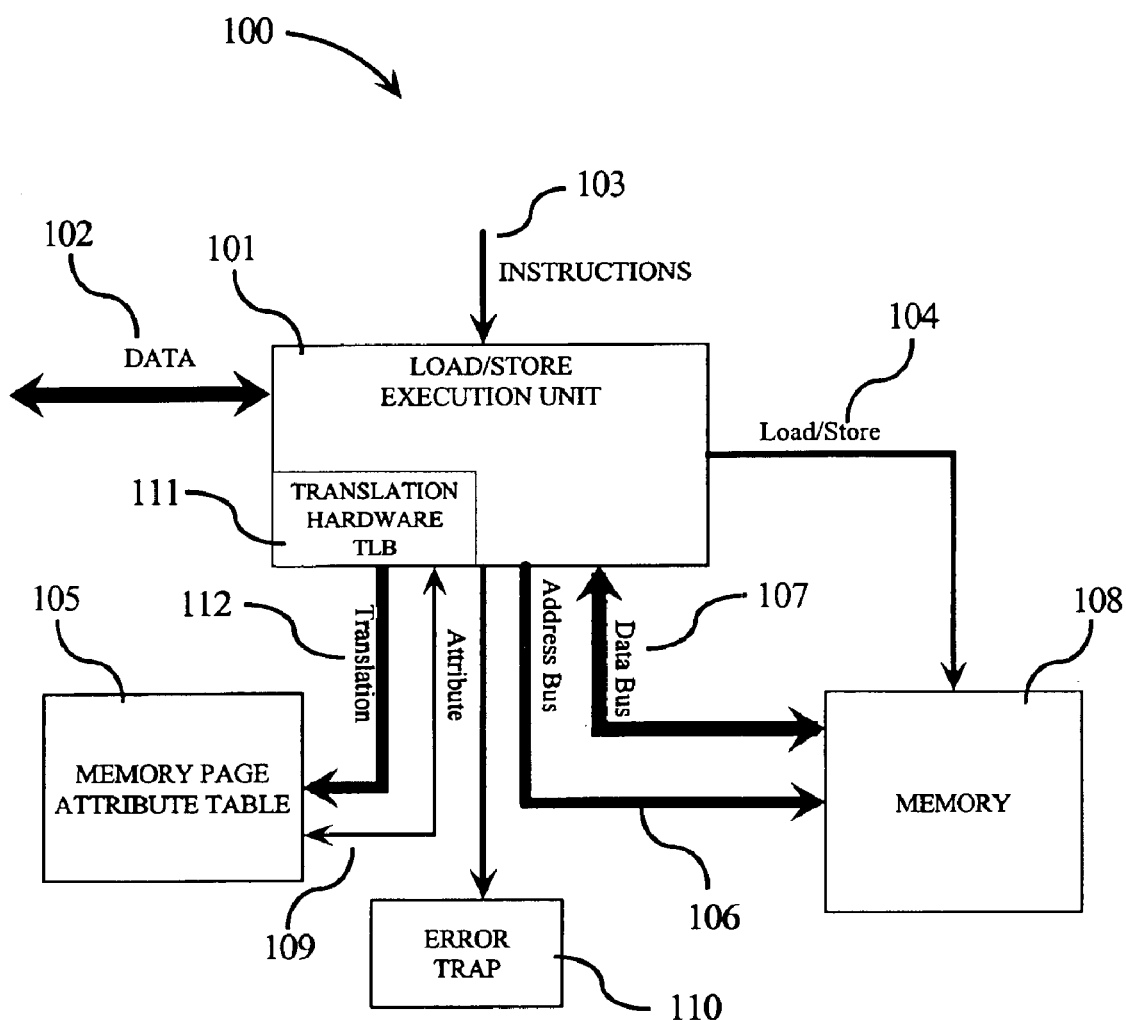
FIG. 1 is a block diagram of CPU hardware circuits used in embodiments of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like may have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 4A:
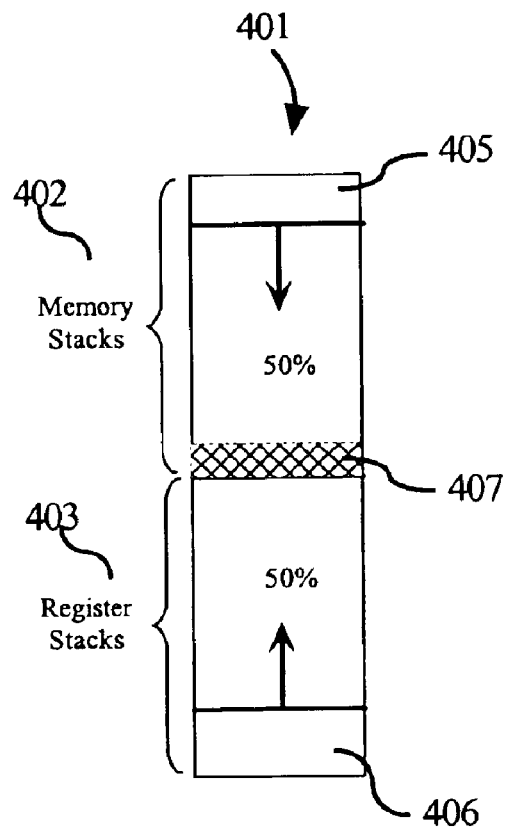
FIG. 4A and FIG. 4B are block diagrams of some prior art program stacks employing protected pages.
Figure 4B:
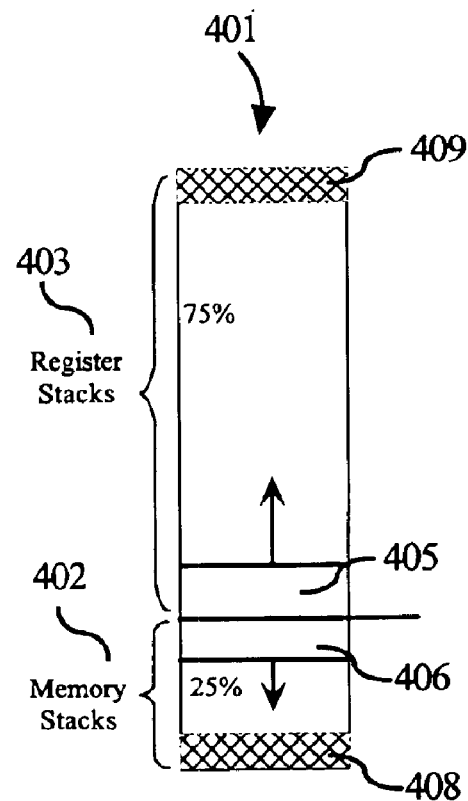

FIGS. 4A and 4B illustrate a prior art memory block 401 designated by an operating system (OS) as stack memory for use as program stacks or processor stacks. Memory block 401 is shown with two different allocations made by the OS before executing a program. In FIG. 4A, memory block 401 is allocated as 50% for program stacks 402 and 50% for processor stacks 403. The OS decides before running a program how memory block 401 is to be allocated to program stacks 402 and processor stacks 403. The OS has two ways in which to assign individual stacks in their respective areas. The OS may start by first assigning program stacks 402 to the higher memory addresses 405 and the processor stacks 403 to the lower addresses 406. As the space in memory block 401 is dynamically assigned, the regions defined by higher addresses 405 and lower addresses 406 "grow" toward each other. To prevent program stacks or processor stacks from over running, a "red zone" or protected page 407 would have to be placed between the program stack 402 area and the processor stack 403 area. In FIG. 4B, the OS has allocated 25% of the memory block 401 to program stacks 402 and 75% to processor stacks 403. In FIG. 4B, the OS assigns the starting addresses so the two stack regions (405 and 406) "grow" apart. In this case two different protected pages 408 and 409 are placed at the memory block bounds (lower and upper). If an access is attempted to a protected page, an error would be indicated. However, there are cases where decrementing a pointer may skip over a protected page (e.g., 407 in FIG. 4A) and an errant write or read may occur in unprotected memory space without a fault indication that a program stack is being written in a processor stack region.

FIG. 1 is a block diagram of load/store hardware 100 within a CPU (see CPU 310 in FIG. 3) used in embodiments of the present invention. Instructions 103 are sent to a load/store unit 101. Decoding load/store instructions will generate a load/store operation 104 which determines whether data is to be written into or read from memory 108. Translation hardware 111 looks up a corresponding virtual address (translation 112) in memory page attribute table 105 to determine if a memory stack attribute 109 is present in the memory block (not shown) being accessed. Address bus 106 sends the actual physical addresses to the memory 108 for the accessed memory block. In embodiments of the present invention, the load/store unit 101 may receive different types of load/store instructions. If the operation is a store to stack memory (within memory 108), then the OS of the CPU 310 generates a stack memory attribute 109 which is associated with the memory block used to store data 102 via data bus 107. In a subsequent stack memory load, the CPU 310 will determine if the memory address requested is associated with the stack memory attribute 109. If the required stack memory attribute 109 is present, then the load is allowed to proceed. If the required stack memory attribute 109 is not present an error is flagged in error trap 110.

Figure 5:
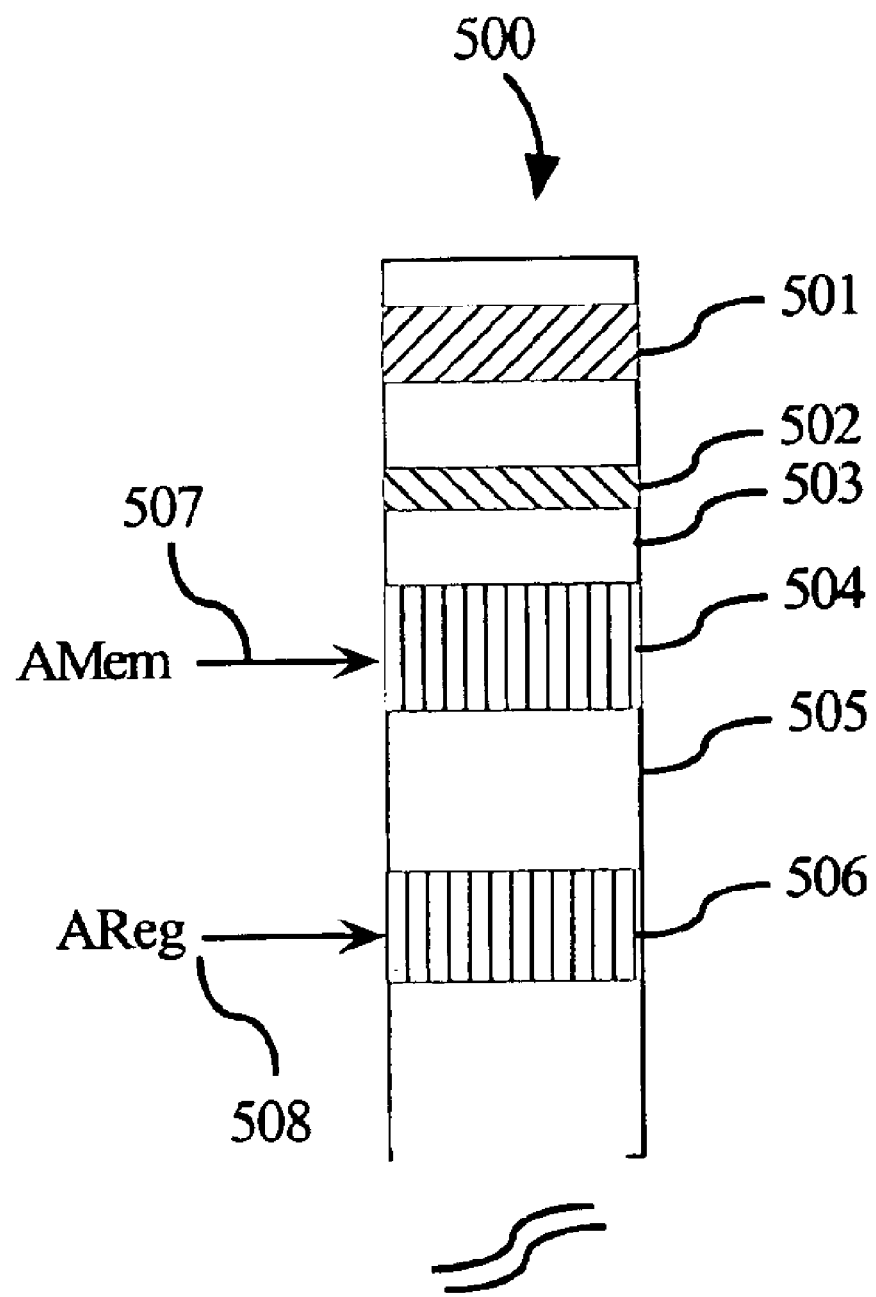
FIG. 5 is a block diagram of memory employing embodiments of the present invention.

FIG. 5 illustrates a block of memory 500 utilizing embodiments of the present invention. AProg 507 illustrates a stack memory attribute associated with program stack 504. Program stack 504 is a block of memory defined with stack memory load and store instructions and a stack memory attribute (AProg 507) identifying the stack memory as a program stack. AProc 508 illustrates a stack memory attribute associated with processor stack 506. Normal memory blocks (e.g., 501, 502, 503 and 505) do not have a stack memory attribute (e.g., AProg 507 or AProc 508) and are only useable for normal loads and stores. Likewise, memory stack blocks 504 and 506 are only useable for stack memory loads and stores. In particular, memory stack block 504 has a program stack attribute (AProg 507) and is useable only for program stacks, and memory stack block 506 has a processor stack attribute (AProc 508) and is useable only for processor stacks.

FIG. 5 illustrates that managing stack memory, using embodiments of the present invention, does not require any "red zones" or protected pages. The OS of the CPU 310 associates a stack memory attribute in a page table (not shown) with each block of memory accessed using a stack memory load/store instruction. The OS no longer has to make an estimate of how it is going to allocate a portion of memory designated as program stack. Rather, stack memory attributes are associated with memory used as stacks (program or processor stacks) on an "as needed" basis thus saving memory space. It should be noted that other stack memory attributes or memory attributes may be defined from managing different types of loads and stores to memory and still be within the scope of the present invention.

Figure 2:
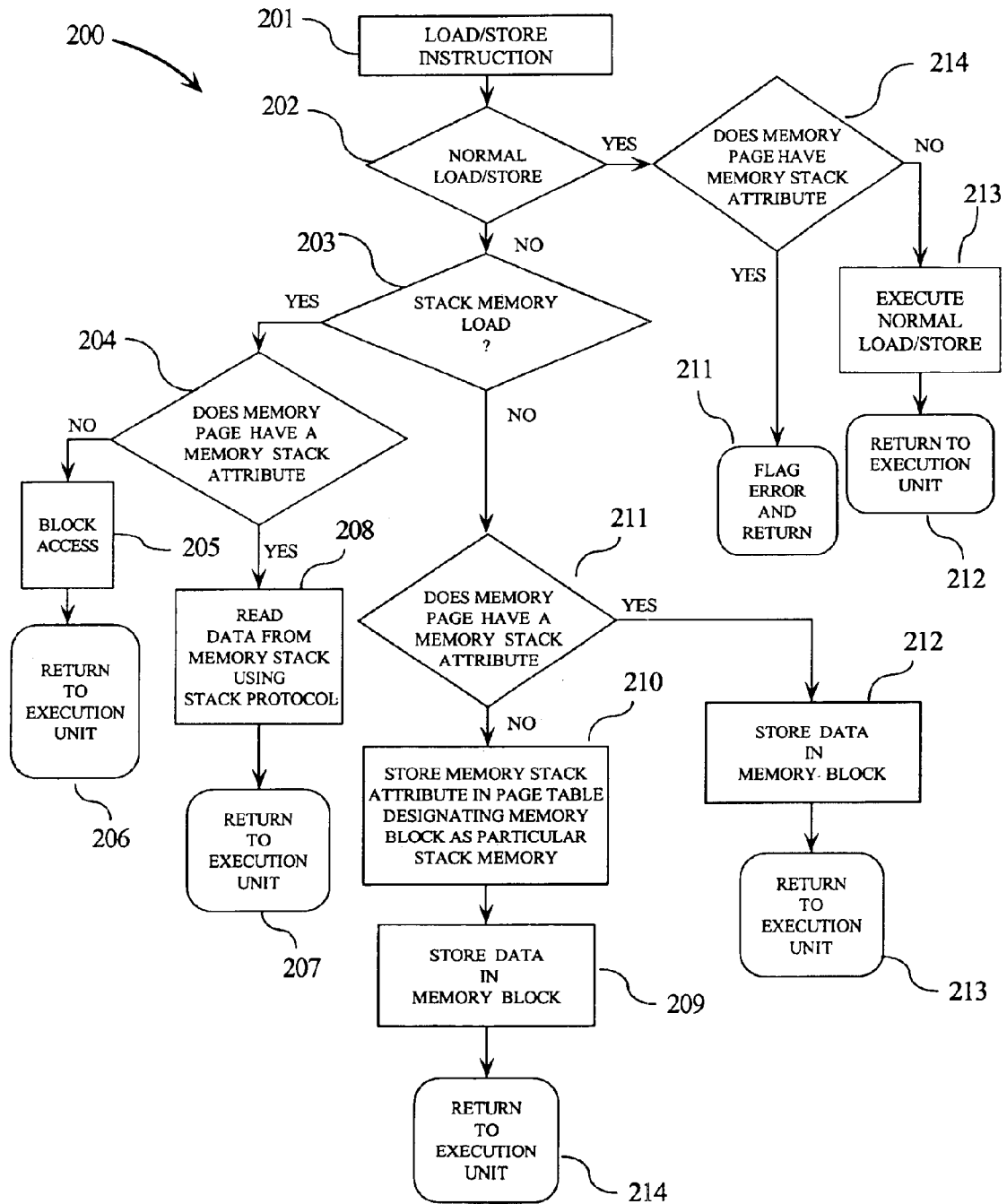
FIG. 2 is a flow diagram of method steps used in embodiments of the present invention.

FIG. 2 is a flow diagram 200 of method steps used in embodiments of the present invention. In step 201, a load/store instruction is decoded in an execution unit. In step 202, the instruction is tested to determine if the instruction is a normal load/store instruction. If the result in step 202 is YES, then a branch to step 214 is executed to determine if the memory page addressed has a stack memory attribute. If the result of the test in step 214 is YES, then an error is flagged in step 215 and a return to step 201 is executed. If the result of the test in step 214 is NO, then in step 218 a normal load/store is executed and a return to the execution unit is executed in step 216. If the result of the test in step 202 is NO, then a branch to step 203 is executed. In step 203 a test is executed to determine whether the memory stack instruction is a stack memory load. If the result in test 203 is NO, then a test is executed in step 220 to determine if the memory page exists. If the result of the test in step 220 is NO, then in step 210 the memory page attribute is stored designating the memory block as stack memory. In step 209, the data is stored in the memory block and a return to step 201 is executed in step 217. If the result in step 220 is YES, then a branch is executed to step 211 to determine if the memory page has the required stack memory attribute. If the result of the test in step 211 is YES, then in step 212 the data is stored in the memory block and in step 213 a return is executed to step 201. If the result of the test in step 211 is NO, then an error is flagged in step 219 along with a return to step. If the result of the test in step 203 is YES, then a test is done in step 204 to determine if the memory page being requested has a stack memory attribute. If the result of the test in step 204 is YES, then data is read using stack protocol in step 208. If the result of the test in step 204 is NO, then access to the memory block is prevented in step 205 and a return to step 201 is executed in step 206.

Figure 3:
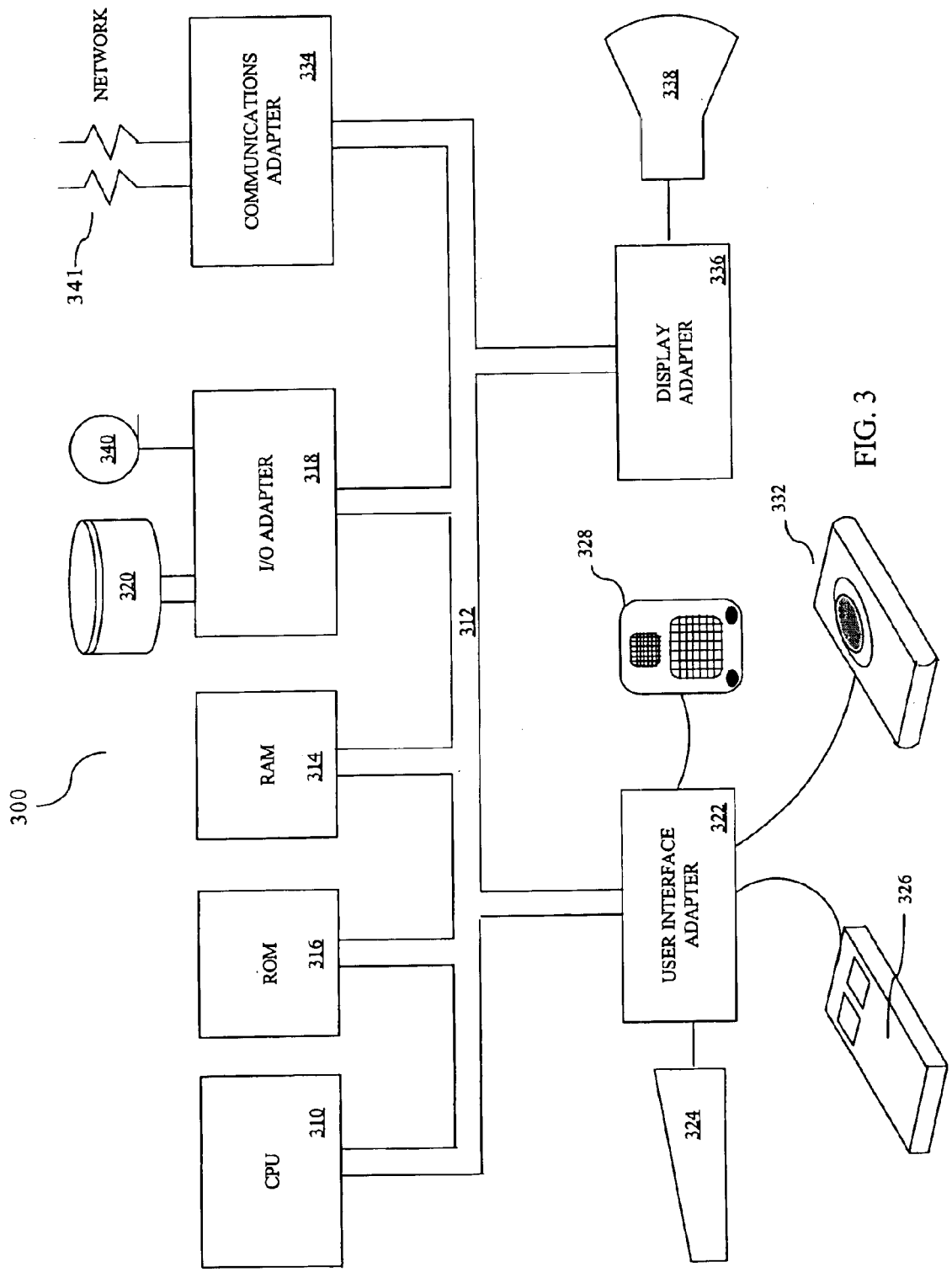
FIG. 3 is a block diagram of a data processing system which comprises a CPU which has an architecture, compiler and an operating system which may use embodiments of the present invention.

Referring to FIG. 3, an example is shown of a data processing system 300 which may use embodiments of the present invention. The system has a central processing unit (CPU) 310, which is coupled to various other components by system bus 312. Read-Only Memory ("ROM") 316 is coupled to the system bus 312 and includes a basic input/output system ("BIOS") that controls certain basic functions of the data processing system 300. Random Access Memory ("RAM") 314, I/O adapter 318, and communications adapter 334 are also coupled to the system bus 312. I/O adapter 318 may be a small computer system interface ("SCSI") adapter that communicates with a disk storage device 320 or tape storage device 340. A communications adapter 334 may also interconnect bus 312 with an outside network 341 enabling the data processing system 300 to communicate with other systems. Input/Output devices are also connected to system bus 312 via user interface adapter 322 and display adapter 336. Keyboard 324, trackball 332, mouse 326, and speaker 328 are all interconnected to bus 312 via user interface adapter 322. Display 338 is connected to system bus 312 via display adapter 336. In this manner, a user is capable of inputting to the system through the keyboard 324, trackball 332, or mouse 326, and receiving output from the system via speaker 328 and display 338.

CPU 310 may execute software programs under an operation system using stack memory load/store instructions according to embodiments of the present invention where stack memory attributes are assigned in a page table. These stack memory attributes (e.g., processor or program) allow memory blocks to be designated for use as specific types of stacks on an as needed basis. Using embodiments of the present invention, an operating system running on CPU 310 would no longer have to speculatively allocate memory as stack memory saving memory space and improving stack memory protection.

What is claimed is:

1. A method for stack memory protection comprising the steps of:
   generating new memory page attributes for a page table used to manage memory, each of said new memory page attributes identifying a block of memory as a new class of memory, each of said new memory page attributes generated by a corresponding new load/store instruction;
   assigning, by an operating system or a processor, a selected one of said new memory page attributes to a selected block of memory, said selected block of memory used as a new class of memory corresponding to said selected new memory page attribute;
   blocking normal load/stores to a memory block having one of said new memory page attributes; and
   blocking a first new load/store to a memory block with one of said new memory page attributes not corresponding to said first new load/store.

2. The method of claim 1, wherein said new classes of memory comprise stack memory with corresponding stack memory load/store instructions.

3. The method in claim 2, wherein a first error condition is generated whenever normal load/stores are attempted to stack memory having a first or a second stack memory attribute with corresponding first or second stack memory load/store instructions.

4. The method in claim 2, wherein a second error condition is generated whenever said stack memory load/stores are attempted to said memory not having said first or second stack memory attribute.

5. The method in claim 2, wherein a third error condition is generated whenever a stack memory load/store for a first memory stack is attempted to a second memory stack, said third error condition also generated if a stack memory load/store for said second memory stack is attempted to said first memory stack.

6. The method of claim 2, wherein said stack memory load/store instructions are executed on a CPU comprising an IA64 architecture.

7. The method of claim 5, wherein said processor stack is an IA64 register stack.

8. The method of claim 5, wherein said second memory stack is a program stack, said program stack used by a programmer or a compiler in managing program flow.

9. A processor comprising stack memory protection circuitry, said processor using blocks of memory as stack memory, said stack memory protection circuitry comprising:
   a stack memory attribute circuit, said stack memory attribute circuit operable to generate memory attributes, said memory attributes associated with each memory block designated as a memory stack;
   a page table attribute storage circuit, said page table attribute circuit operable to store and associate one of said stack memory attributes with a block of memory designated as stack memory;
   a stack memory allocation circuit, said stack memory allocation circuit operable to identify a block of memory as a stack memory and associate said memory block with one of said stack memory attributes, said stack memory attributes stored in a memory page table; and
   a stack memory instruction execution circuit, said stack memory instruction execution circuit operable to decode load/store instructions to memory blocks, said stack memory instruction execution circuit granting stack memory load and stores to memory blocks having a required stack memory attribute and not granting stack memory load and stores to memory blocks not having said required stack memory attribute.

10. The processor in claim 9, wherein a first error condition is generated whenever normal load/stores are attempted to stack memory having a first or a second stack memory attribute.

11. The processor in claim 9, wherein a second error condition is generated whenever said stack memory load/stores are attempted to memory not having a stack memory attribute.

12. The processor in claim 9, wherein a third error condition is generated whenever a stack memory load/store for a first memory stack is attempted to a second memory stack, said third error condition also generated if a stack memory load/store for said second memory stack is attempted to said first memory stack.

13. The processor of claim 9, wherein said stack memory load and store instructions are executed on a CPU comprises an IA64 architecture.

14. The processor of claim 12, wherein said second memory stack is a program stack, said program stack used by a programmer or a compiler in managing program flow.

15. A data processing system, comprising:
   a central processing unit (CPU);
   shared random access memory (RAM);
   read only memory (ROM);
   an I/O adapter; and
   a bus system coupling said CPU to said ROM, said RAM said display adapter, wherein said CPU, said CPU comprising stack memory protection circuitry, said stack memory protection circuitry comprising:

a stack memory attribute circuit, said stack memory attribute circuit operable to generate memory attribute, said memory attribute associated with each memory block designated as a memory stack;

a page table attribute storage circuit, said page table attribute circuit operable to store and associate said stack memory attribute with a block of memory designated as stack memory, a stack memory allocation circuit, said stack memory allocation circuit operable to identify a block of memory as a stack memory and associate said memory block with a stack memory attribute, said stack memory attribute stored in a memory page table; and a stack memory instruction execution circuit, said stack memory instruction execution circuit operable to decode load/store instructions to memory blocks, said stack memory instruction execution circuit granting stack memory load and stores to memory blocks having a stack memory attribute and not granting stack memory load and stores to memory blocks not having said stack memory attribute.

16. The data processing system in claim 15, wherein a first error condition is generated whenever normal load/stores are attempted to stack memory having a first or a second stack memory attribute.

17. The data processing system in claim 15, wherein a second error condition is generated whenever said stack memory load/stores are attempted to memory not having a stack memory attribute.

18. The data processing system in claim 15, wherein a third error condition is generated whenever a stack memory load/store for a first memory stack is attempted to a second memory stack, said third error condition also generated if a stack memory load/store for said second memory stack is attempted to said first memory stack.

19. The data processing system of claim 15, wherein said stack memory load and store instructions are executed on a CPU comprising an IA64 architecture.

20. The data processing system of claim 18, wherein said second memory stack is a program stack, said program stack used by a programmer or a compiler in managing program flow.

21. A computer program product embodied in a machine readable medium, including an operating system and a compiler for a processor system, comprising; a program of instructions for performing the program steps of:

generating new memory page attributes for a page table used to manage memory, each of said new memory page attributes identifying a block of memory as a new class of memory, each of said new memory page attributes generated by a corresponding new load/store instruction;

assigning, by an operating system or a processor, a selected one of said new memory page attributes to a selected block of memory, said selected block of memory used as a new class of memory corresponding to said selected new memory page attribute;

blocking normal load/stores to a memory block having one of said new memory page attributes; and blocking a first new load/store to a memory block with one of said new memory page attributes not corresponding to said first new load/store.

22. The computer program product of claim 21, wherein said new classes of memory comprise stack memory.

23. The computer program product in claim 22, wherein a first error condition is generated whenever normal load/stores are attempted to stack memory having a first or a second stack memory attribute.

24. The computer program product in claim 23, wherein a second error condition is generated whenever said stack memory load/stores are attempted to memory not having said stack memory attribute.

25. The computer program product in claim 23, wherein a third error condition is generated whenever a stack memory load/store for a first memory stack is attempted to a second memory stack, said third error condition also generated if a stack memory load/store for said second memory stack is attempted to said first memory stack.

26. The computer program product of claim 23, wherein said stack memory load/store instructions are executed on a CPU comprising an IA64 architecture.

27. The computer program product of claim 26, wherein said first memory stack is a processor stack, said processor stack used by a processor to load and store hardware register contents during program execution, said processor stacks transparent to a programmer or a compiler.

28. The computer program product of claim 27, wherein said processor stack is an IA64 register stack.

* * * * *

UNITED STATES PATENT AND TRADEMARK OFFICE
CERTIFICATE OF CORRECTION

PATENT NO. : 6,895,508 B1
DATED : May 17, 2005
INVENTOR(S) : Randal Craig Swanberg and Michael Stephen Williams It is certified that error appears in the above-identified patent and that said Letters Patent is hereby corrected as shown below:

Column 8,
Lines 26, 30 and 36, please replace "23" with -- 22 --.

Signed and Sealed this

Thirteenth Day of September, 2005

JON W. DUDAS
*Director of the United States Patent and Trademark Office*